United States Patent [19]

Kozyra et al.

[11] Patent Number: 5,366,233
[45] Date of Patent: Nov. 22, 1994

[54] WIRE FORM STEERING ARM LINK

[75] Inventors: William L. Kozyra, Rochester Hills; Ronald M. Revyn, Roseville; Victor A. Utykanski, Warren, all of Mich.

[73] Assignee: The Budd Company, Troy, Mich.

[21] Appl. No.: 885,123

[22] Filed: May 18, 1992

[51] Int. Cl.$^5$ .............................................. B62D 7/18
[52] U.S. Cl. ................................................... 280/96.1
[58] Field of Search ....................... 280/96.1, 660, 673, 280/96.3, 97, 98, 781

[56] References Cited

U.S. PATENT DOCUMENTS

| | | |
|---|---|---|
| 2,435,814 | 2/1948 | Allison . |
| 2,771,301 | 11/1956 | Booth et al. . |
| 3,240,509 | 3/1966 | Pierce ............................ 280/96.1 |
| 3,908,480 | 9/1975 | Afanador et al. ............. 280/96.1 |
| 3,940,159 | 2/1976 | Pringle . |
| 4,618,159 | 10/1986 | Kozyra et al. ................. 280/96.1 |
| 4,761,019 | 8/1988 | Dubensky ...................... 280/96.1 |
| 5,145,204 | 9/1992 | Perkins .......................... 280/96.1 |
| 5,219,176 | 6/1993 | Mitchell ......................... 280/96.1 |

*Primary Examiner*—Stephen P. Avila
*Attorney, Agent, or Firm*—Harness, Dickey & Pierce

[57] ABSTRACT

A steering knuckle assembly for a motor vehicle. The steering knuckle assembly includes a stamped knuckle housing which provides attachment points for various suspension components, including a steering arm. The knuckle housing is formed with a pair of generally spaced apart, opposing side walls being connected by an integral transverse wall. Opposite of the transverse wall, a steering arm link bridges the gap between the side walls thereby increasing the resistance of the knuckle housing to bending and torsional loads. Extending off of one end the steering arm link is a mounting arm which provides an attachment point for the steering arm.

9 Claims, 2 Drawing Sheets

WIRE FORM STEERING ARM LINK

BACKGROUND AND SUMMARY OF THE INVENTION

This invention generally relates to motor vehicle suspension components and, more particularly, to a steering knuckle assembly including a stamped steering knuckle housing with an attached steering arm link.

Conventionally steering knuckle assemblies are constructed with one-piece forged or cast housings. Attached to these integral units are wheel bearing carriers, torque arms, disc-type brake calipers, ball joints, struts, steering links and other suspension components. Although conventional steering knuckles perform satisfactorily, it is desirable to optimize production costs and enhance structural characteristics in the steering knuckle design.

It is particularly desirable to reduce the weight of the steering knuckle assembly. Weight reductions in this area are advantageous since they reduce both the total vehicle weight and the suspension unsprung mass. Reductions in unsprung mass are themselves desirable since they provide significant improvements in the ride and handling of the vehicle. Overall, weight reductions help to improve both performance and fuel efficiency in the vehicle. As in all manufacturing processes, it is always desirable to provide for an improved steering knuckle assembly which can be produced at a cost savings over current designs.

In reducing weight, and simplicity of construction, one advance has been the production of concave, shell shaped steering knuckle housings, preferably manufactured using metal stamping processes. Such stamped steering knuckles are disclosed in U.S. Pat. Nos. 4,618,159 and 4,722,540 and U.S. Pat. application Ser. No. 579,369, all of which have been assigned to the assignee of the present application and which are hereby incorporated by reference. Stamped steering knuckle housings are often reinforced with one or more internally disposed plates and are further provided with mounting bushings for the various suspension components. Often, the reinforcing plates and the mounting bushings are welded to the stamped housing.

When compared to a conventional steering knuckle design, the stamped composite structure provides a significant weight advantage, primarily due to the use of the stamped components. The use of stamped components also reduces the total cost of the knuckle assembly because of reduced tooling requirements for stamped metal parts as compared to tooling requirements for casting and machining operations.

Additional desirable improvements in a stamped steering knuckle assembly are provided by this invention. In accordance with the preferred embodiment of this invention, a steering knuckle housing is formed by metal stamping processes. The stamping process produces an integrally formed steering knuckle housing having an open shell configuration with a pair of generally opposed side walls and a transverse wall extending therebetween. A steering arm link is mounted to the steering knuckle housing so as to bridge the gap or channel between the opposing sidewalls. The steering arm link operates as a truss or support member extending across the gap and provides the steering knuckle assembly with a box-like, closed construction that further enhances the structural integrity of the assembly. With an interest toward further reducing the weight of the steering knuckle assembly, the steering arm link is integrally constructed. In particular, the steering arm link is provided in solid wire form.

The steering arm link is mounted to flanges which extend off of the opposing side walls of the knuckle housing and includes a side portion which extends to one side of the knuckle housing. This extension forms an attachment point for the steering arm. By bridging the gap between the side walls of the stamped steering knuckle housing, the steering knuckle assembly of the present invention is capable of handling increased torsional and bending loads.

Additional benefits and advantages of the present invention will become apparent to those skilled in the art to which this invention relates from the subsequent description of the preferred embodiment and the appended claims, taken in conjunction with the accompanying drawings.

DETAILED DESCRIPTION OF THE PREFERRED EMBODIMENT

Figure 1:
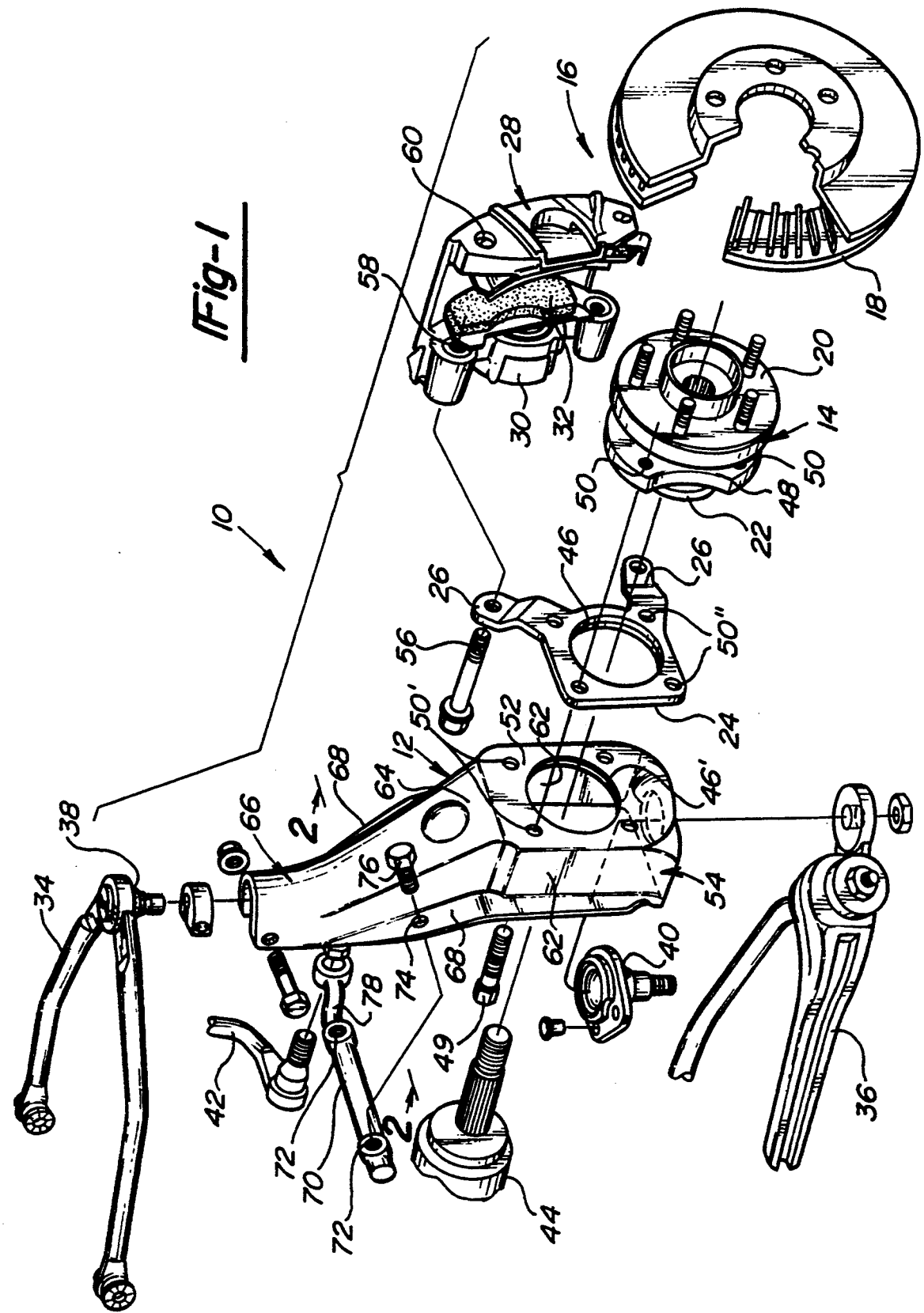
FIG. 1 is a perspective view of a steering knuckle assembly according to this invention showing the components thereof in exploded positions and further showing associated components.

A steering knuckle assembly embodying the principles of this invention is generally shown in FIG. 1 and designated by reference character 10. The primary components of the steering knuckle assembly 10 include a knuckle housing 12, a hub and bearing assembly 14 and brake assembly 16. The steering knuckle assembly 10 is designed to receive a bearing 22 for rotatably mounting a hub 20 and a disc brake rotor 18. The brake assembly 16 itself includes, in addition to the rotor 18, a torque plate 24 having caliper support arms 26 that ensure proper positioning a disc brake caliper assembly 28 which includes a caliper 30 and brake shoes 32.

The steering knuckle assembly 10 further provides mounting points for various suspension components including, but not limited to, an upper control arm 34 having an upper ball joint 38, a lower control arm 36 having a lower ball joint 40, and a steering arm 42. While the steering knuckle assembly 10, described and illustrated herein, is intended for use with a driven axle 44, the novel features of this invention are also applicable to non-driven axle configurations.

The torque plate 24 includes a central bore 46 which is dimensioned to accept the cylindrical portion of the wheel bearing 22. Although alternative mounting systems may be employed, the outer race of the wheel bearing 22 is provided or fitted with a transverse mounting flange or plate 48 having bores 50 for mounting. The mounting plate 48 is secured to the torque plate 24 and the knuckle housing 12 by fasteners 49 extending through the mounting bores 50, 50' and 50", respectively formed in the mounting plate 48, the knuckle housing 12 and the torque plate 24. For this and other reasons, a flat face 52 is formed on the outboard side of a lower end 54 of the knuckle housing 12. A central bore 46' is defined in a portion of the flat face 52 to receive the bearing 22.

The torque plate 24, as mentioned above, includes an integrally formed, radially extending pair of angularly offset caliper support arms 26. The support arms 26 are configured to accept the disc brake caliper assembly 28. The caliper support arms 26 operate as reaction points which enable the disc brake caliper assembly 28, more specifically the brake pads 30, to exert a frictional retarding force upon the disc brake rotor 18. Threaded fasteners 56 are extended through the caliper support arms 26 and received within first and second bores 58 and 60 to secure the disc brake caliper assembly 28 onto the support arms 26.

The steering knuckle housing 12 is preferably formed from sheet metal stock utilized in a metal stamping process which readily converts the stock metal blanks into finished parts. Since formation of the knuckle housing 12 requires a considerable degree of deformation of the metal, mild steel is the preferred material.

The knuckle housing 12 may generally be described as a concave shell having opposed side walls 62 and a transverse wall 64 extending therebetween and connecting the opposing side walls 62. As such, a gap or channel 63 is defined between the side walls 62. The knuckle housing 12 has a distinct upper end 66 and lower end 54. The upper end 66 is configured and provides an attachment point for the upper control arm 34. Similarly, the lower end 54 is configured to provide an attachment point for the lower control arm 36. The upper and lower control arms 34 and 36 may be attached to the knuckle housing 12 by the various known methods for attaching the ball joints 38 and 40. As seen in the figures, however, the knuckle housing 12 has only bolted on components.

Flat flanges 68 extend substantially transversely outward from the inboard sides of the opposing side walls 62. As illustrated, the flanges 68 extend the length of the side walls 62. However, flanges 68 could also be utilized which extend less than the length of the side walls 62. As more fully discussed below, the flanges 68 provide attachment points for a steering arm link 70.

The steering arm link 70 is a wire form or rod-like structure having mounting bores 72 defined substantially transversely therethrough. The bores 72 are dimensioned so as to correspond with mounting bores 74 defined in the flanges 68. To secure the steering arm link 70 to the flanges 68, the bores 72 of the steering arm link 70 are threaded to receive threaded fasteners 76 extended through mounting bores 74 in the flanges 68.

The steering arm link 70 is attached to the knuckle housing 12, and in particular the flanges 68, in about the middle one-third of the vertical height of the knuckle housing 12, between the upper and lower ends 66, 54 which may be considered as respectively being the upper and lower one-thirds of the vertical height. Depending on the specific vehicle application, it may be desirable to locate and attach the steering arm link 70 to the flanges 68 at about the mid-point of the vertical height. The location, however, could vary upwardly or downward depending on the specific steering arm 42 location.

Figure 2:
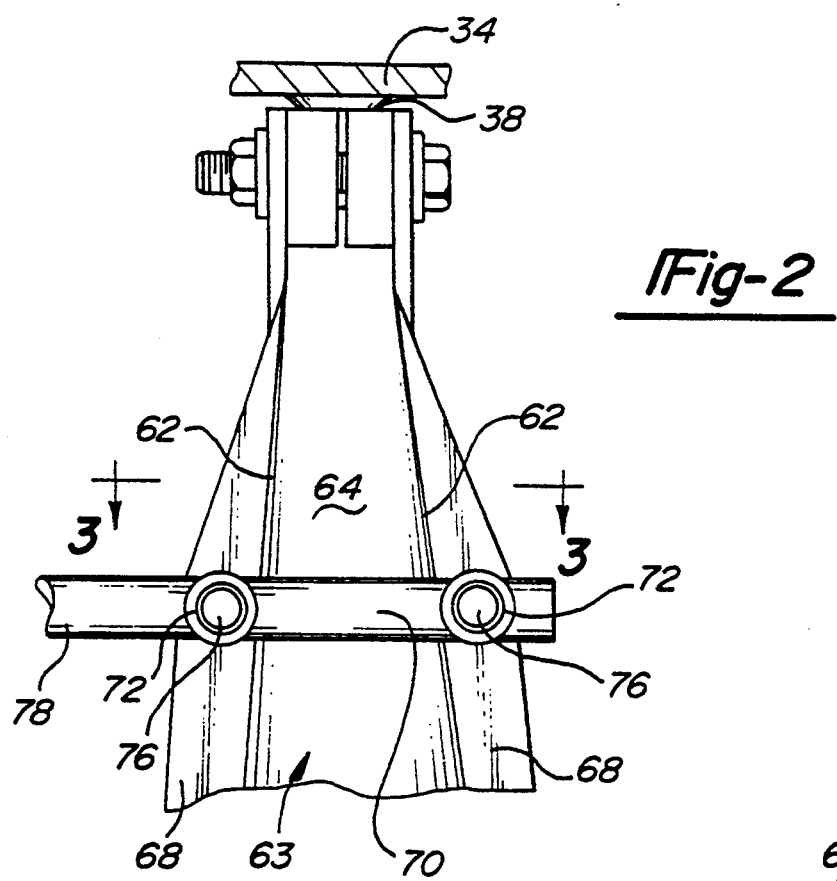
FIG. 2 is an elevational view of a portion of the inboard side of the steering knuckle assembly taken substantially along line 2—2 in FIG. 1 and showing the mounting of the steering arm link to the knuckle housing.
Figure 3:
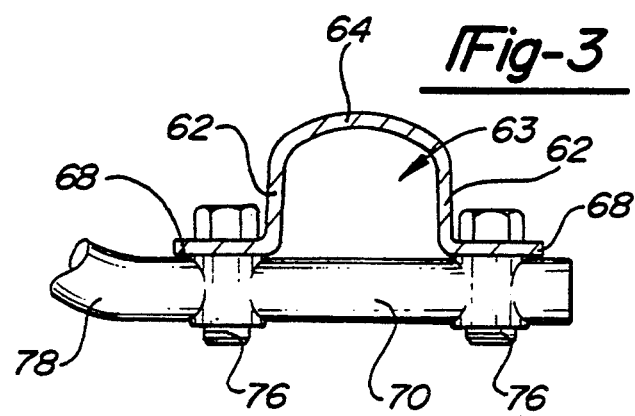
FIG. 3 is a cross-sectional view taken substantially along line 3—3 in FIG. 2 showing the mounting of the steering arm link to the knuckle housing.

As seen in FIGS. 2 and 3, when mounted to the knuckle housing 12, the steering arm link 70 bridges the gap 63 between the opposing side walls 62. The box-shaped construction of the steering knuckle assembly 10 with the steering arm link 70 increases the assembly's 10 structural integrity and its resistance to bending and torsional loads as might be encountered during operation of the vehicle. A mounting arm 78 extends from one end of the steering arm link 70 and is configured to receive the steering arm 42. The mounting arm 78 is provided at its end with a mounting 80 that allows the steering arm 42 to be threadably or otherwise secured thereto. As seen in FIG. 1, the mounting arm 78 can be curved or alternatively configured to more readily allow for mounting and functioning of the steering arm 42.

By constructing the steering arm link 70 in a solid wire form, various cost savings are achieved during production resulting in an overall steering knuckle assembly 10 of decreased cost. Furthermore, by providing the steering arm link 70 as a unitary structure, its weight is reduced along with the overall weight of the steering knuckle assembly 10.

Figure 4:
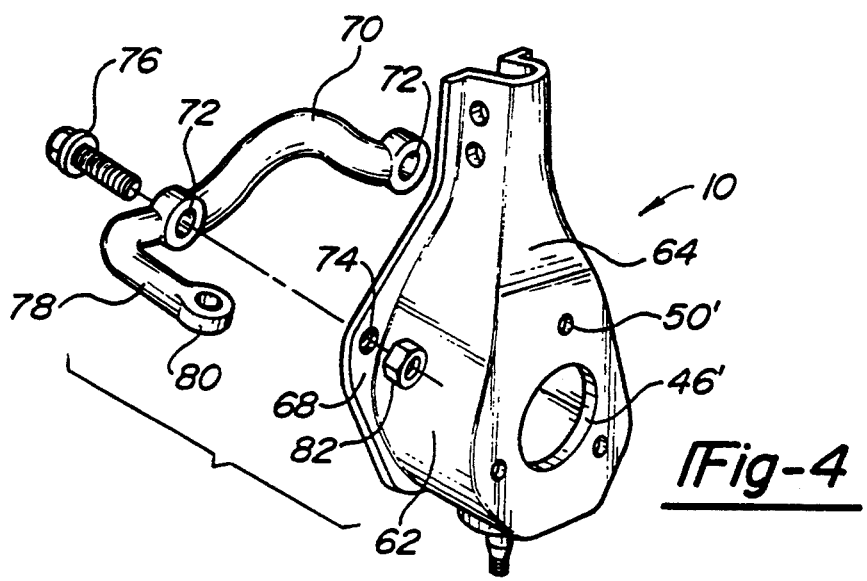
FIG. 4 is an exploded perspective view of a second embodiment of a steering knuckle assembly incorporating the principles of the present invention.

A steering knuckle assembly 10 embodying the principles of the present invention can embody differing shapes and configurations for the knuckle housing 12 and the wire form steering arm link 70. As seen in FIG. 4, the portion of the steering arm link 70, shown mounted at about the mid-point of the vertical height of the housing 12, which spans the gap 63 between the side walls 62 can be curved to accommodate other components of the vehicle, such as a drive axle. Furthermore, the steering arm link 70 is mounted to the knuckle housing by a nut 82 engaging the threaded fastener 76. Also, the mounting arm 78 can readily be reconfigured to accommodate different vehicle requirements.

While the above description constitutes the preferred embodiments of the present invention, it will be appreciated that the invention is susceptible to modification, variation and change without departing from the proper scope and fair meaning of the accompanying claims.

What is claimed is:

1. A steering knuckle assembly for a motor vehicle, said steering knuckle assembly having mounting provisions for suspension components including a steering arm, said assembly comprising:

a unitarily formed stamped steering knuckle housing having an upper end, a middle portion, a lower end, a pair of generally opposed side walls and a transverse wall, said transverse wall extending between and connecting said side walls, said steering knuckle housing forming a generally U-shaped channel in horizontal cross-section, said channel being open on one side as defined by a gap between said side walls and opposite of said transverse wall;

a unitary wire-form steering arm link including a portion adapted for mounting said steering arm thereto; and mounting means on said knuckle housing for providing a mounting for said steering arm link and said steering link being mounted to said knuckle housing so as to extend across said gap between said side walls forming a box-type structure and thereby increasing the structural integrity of said knuckle housing.

2. A steering knuckle assembly as set froth in claim 1 wherein said mounting means includes flanges which are flat and extend generally outward from said side walls.

3. A steering knuckle assembly as set forth in claim 2 wherein said steering arm link is mounted to said flanges by fasteners.

4. A steering knuckle assembly as set forth in claim 3 wherein said flanges includes portions defining bores therethrough, said fasteners being extended through said bores.

5. A steering knuckle assembly as set forth in claim 1 wherein said steering arm link includes portions having mounting bores defined substantially transversely therethrough, fasteners being extended through said mounting bores and engaging said mounting means.

6. A steering knuckle assembly as set forth in claim 5 wherein said mounting bores are threaded.

7. A steering knuckle assembly as set forth in claim 1 wherein said steering knuckle housing is formed of stamped metal.

8. A steering knuckle assembly as set froth in claim 1 wherein said steering arm link is substantially rod-like.

9. A steering knuckle assembly as set forth in claim 1 wherein said steering arm link is mounted to said knuckle housing at about mid-vertical height of said knuckle housing.

* * * * *